United States Patent

Juhrig

(10) Patent No.: US 9,069,335 B2
(45) Date of Patent: Jun. 30, 2015

(54) EMERGENCY STOP MODULE ARRANGEMENT

(75) Inventor: Mark Juhrig, Otzberg (DE)

(73) Assignee: SCHNEIDER ELECTRIC AUTOMATION GMBH, Seligenstadt (DE)

(*) Notice: Subject to any disclaimer, the term of this patent is extended or adjusted under 35 U.S.C. 154(b) by 765 days.

(21) Appl. No.: 13/238,210

(22) Filed: Sep. 21, 2011

(65) Prior Publication Data

US 2012/0139360 A1    Jun. 7, 2012

(30) Foreign Application Priority Data

Sep. 22, 2010 (DE) .......................... 10 2010 037 714

(51) Int. Cl.
*H02B 1/24* (2006.01)
*G05B 9/02* (2006.01)
*G05B 19/042* (2006.01)

(52) U.S. Cl.
CPC .............. *G05B 9/02* (2013.01); *G05B 19/0428* (2013.01); *G05B 2219/24003* (2013.01); *G05B 2219/50198* (2013.01)

(58) Field of Classification Search
CPC ................. G05B 19/0428; G05B 9/02; G05B 2219/24003; G05B 2219/50198
USPC ............................................. 307/326; 700/3
See application file for complete search history.

(56) References Cited

U.S. PATENT DOCUMENTS

| | | | |
|---|---|---|---|
| 7,242,116 B2* | 7/2007 | Kawazu et al. ............... | 307/326 |
| 7,369,902 B2* | 5/2008 | Nakayama et al. ............ | 700/3 |
| 7,439,639 B2* | 10/2008 | Nitsche ........................ | 307/326 |
| 7,555,353 B2* | 6/2009 | Teranishi et al. .............. | 700/3 |
| 2002/0175568 A1* | 11/2002 | Clement et al. ............... | 307/326 |
| 2003/0011250 A1* | 1/2003 | Pullmann et al. ............. | 307/326 |

(Continued)

FOREIGN PATENT DOCUMENTS

| | | |
|---|---|---|
| CN | 1301395 | 6/2001 |
| CN | 1917118 | 2/2007 |

(Continued)

OTHER PUBLICATIONS

Siemens AG: "Wie geht Schaltschrankbau einfach schneller? Mit den SIRIUS Innovationen passt alles zusammen: Klick and fertig", Internet, Sep. 1, 2009, XP-002667746.

(Continued)

*Primary Examiner* — Jared Fureman
*Assistant Examiner* — Joel Barnett
(74) *Attorney, Agent, or Firm* — Ladas & Parry LLP

(57) ABSTRACT

An emergency stop module arrangement having a logic circuit for the detecting a switching status of an emergency stop switch and for the control of a load switch for the safe connection and disconnection of a load, wherein the emergency stop module arrangement has a first emergency stop module and a second emergency stop module, and wherein the first emergency stop module is coupled via an interface connection to the second emergency stop module. To reduce the wiring complexity as well as the space requirement for the arrangement in a switching cabinet, it is provided that the emergency stop modules are designed as plug-on modules which can be plugged on the load switches, and that each one of the emergency stop modules has at least one switching means which is mechanically positively driven with the coupled load switch.

5 Claims, 6 Drawing Sheets

(56) References Cited

U.S. PATENT DOCUMENTS

2006/0271833 A1    11/2006  Teranishi et al.
2010/0211195 A1*  8/2010  Gebuhr et al. .................. 700/79

FOREIGN PATENT DOCUMENTS

| CN | 101180698 | 5/2008 |
| DE | 100 38 953 | 2/2002 |
| DE | 307793 | 5/2003 |
| DE | 102006030706 A1 | 1/2008 |
| DE | 102007002176 A1 | 7/2008 |
| DE | 102008058303 A1 | 5/2010 |
| WO | 2010031414 A1 | 3/2010 |

OTHER PUBLICATIONS

Siemens AG: "SIRIUS Innovationen Technische Informationen" Internet, Sep. 1, 2009, XP-002667747.
Product Description "Safety Automation System Solutions; Preventa Safety Modules Type XPS-AF", Schneider Electric, 38781-EN_VER 9.1 indd.
Chinese Office Action dated Dec. 17, 2014, corresponding to Chinese Application No. 201110351103.9, with English Translation.

* cited by examiner

EMERGENCY STOP MODULE ARRANGEMENT

The invention relates to an emergency stop module arrangement according to the preamble of Claim 1.

Such an emergency stop module arrangement as well as a method for operating one are disclosed in DE-A-100 38 953. The emergency stop module arrangement comprises a logic circuit for the detection of a switching status of an emergency stop switch and for the control of a load switch to ensure safe connection and disconnection of a load. Moreover, an emergency stop master microprocessor and an emergency stop slave microprocessor are provided, wherein the emergency stop master microprocessor is coupled via an internal interface connection to the emergency stop slave microprocessor.

An emergency stop module arrangement is known, for example, from the product description "Safety Automation System Solutions; Preventa Safety Modules Type XPS-AF," Schneider Electric, 38781-EN_VER 9.1.indd.

Figure 1:
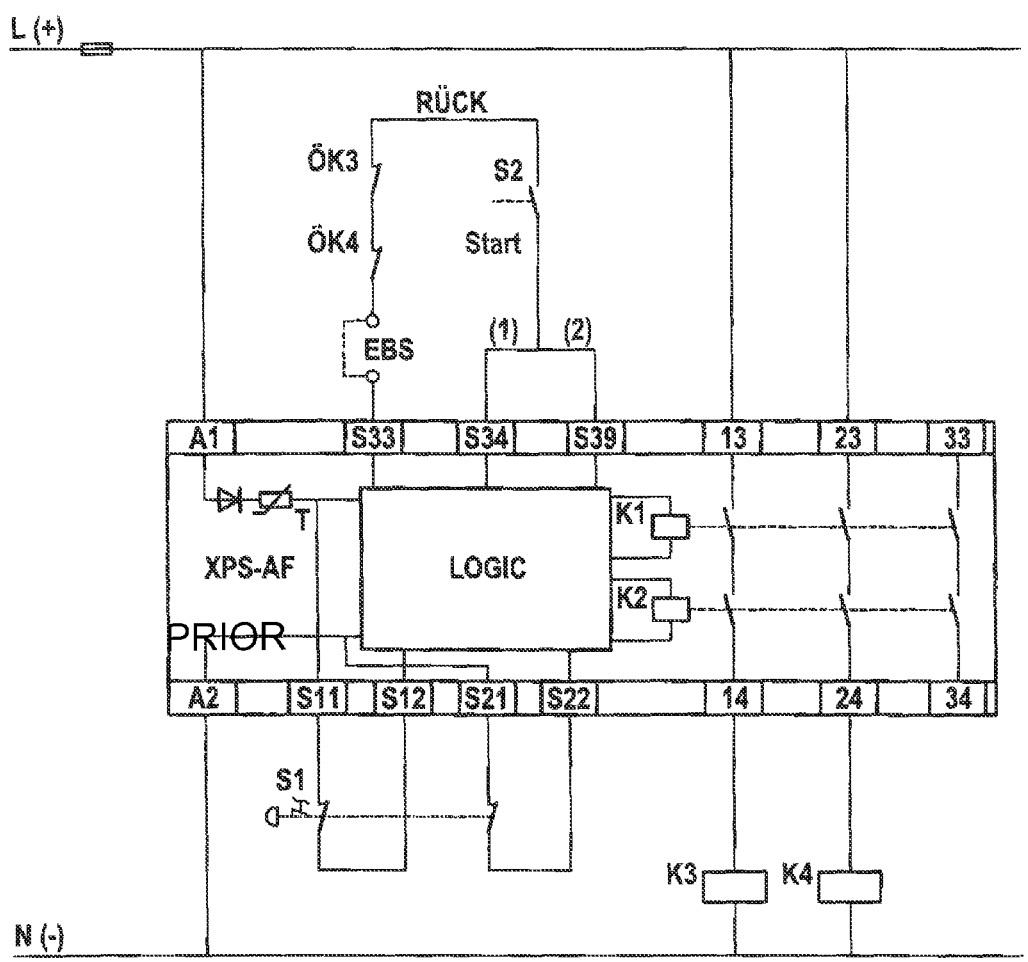

The emergency stop safety circuit according to the state of the art is represented in FIG. 1. The basis of the safety circuit is the emergency stop module XPS-AF which is connected to supply voltage L+, N− via connection lines. The emergency stop module XPS-AF comprises inputs S11-S12 as well as S21-S22 by means of which a switching status of the normally closed contacts of a two-channel emergency stop switch S1 can be evaluated using a logic circuit LOGIC. The logic circuit LOGIC has outputs for the control of relays K1, K2, the series-connected normally open contacts of which in each case form enabling paths 13-14 as well as 23-24. To increase the switching current, load switches K3, K4 can be connected via the enabling paths 13-14, 23-24, allowing the connection or disconnection of an external consumer, such as a motor, via the normally open contacts (not shown) of said load switches.

Moreover, the emergency stop module XPS-AF comprises inputs S33, S34, S39 for the detection of a switching status of a feedback loop RÜCK. The feedback loop RÜCK comprises a series connection of normally closed contacts ÖK3, ÖK4 that are positively driven by the load switches K3, K4, and optionally a start push button S2. The normally closed contacts ÖK3, ÖK4 can be provided by the load switches themselves, or by means of auxiliary switches HS3, HS4 which can be plugged on the load switches.

Although the emergency stop module XPS-AF is usually enlarged with the load switches K3, K4 and auxiliary switches HS3, HS4 to increase a switching current, this has a corresponding effect on the wiring complexity.

Figure 2:
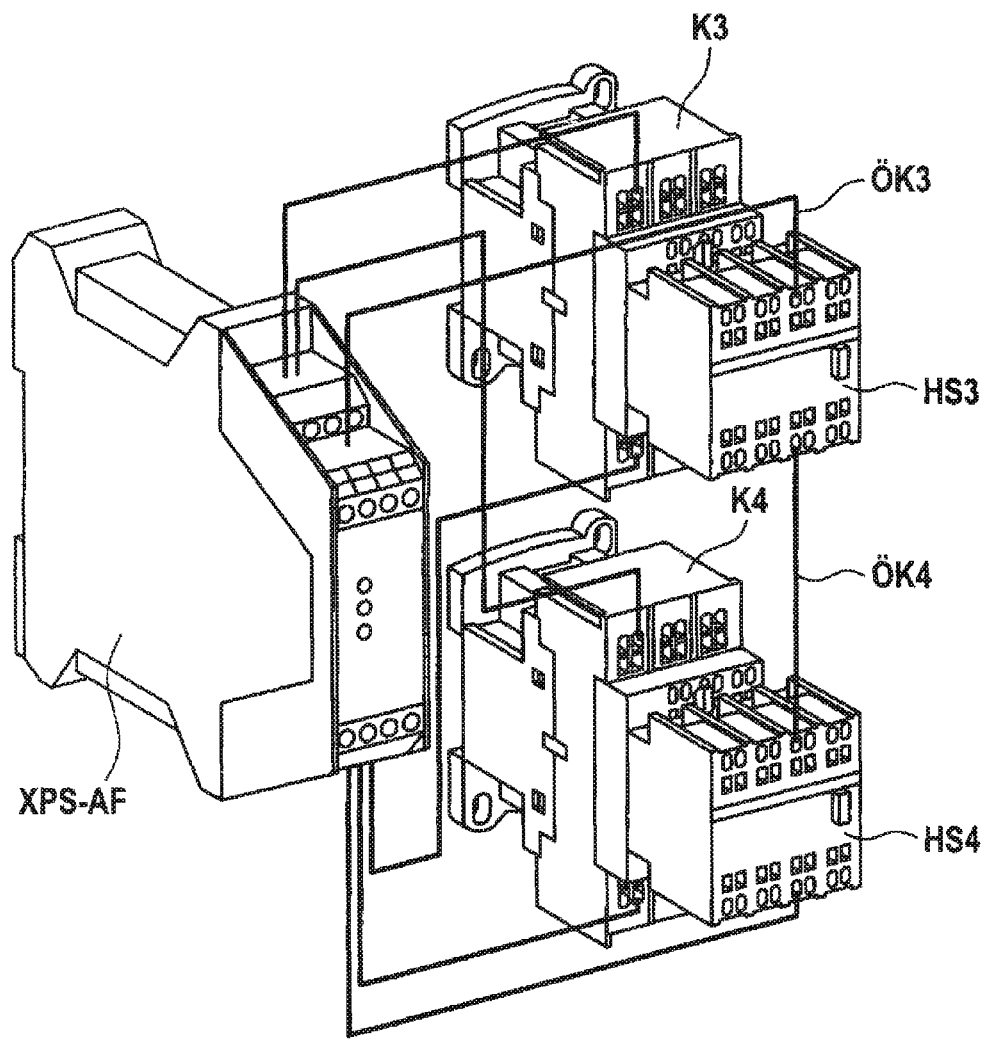

FIG. 2 shows a perspective view of a conventional wiring using the emergency stop module XPS-AF according to FIG. 1 with two load switches in the form of contactors K3, K4 as well as auxiliary switches HS that can be plugged on the load switches.

For the wiring of the feedback loop RÜCK, a total of three connection lines is needed. In addition, there are control lines for the load switches. Furthermore, a total of five component assemblies is needed.

On this basis, the problem of the present invention is to further develop an emergency stop module arrangement in such a manner that the wiring complexity as well as the place requirement in a switch cabinet is reduced.

To solve the problem, an emergency stop module arrangement having the characteristics of Claim 1 is proposed.

By integrating an emergency stop functionality in the switching means modules that can be plugged on the respective load switches, both the place requirement in the switch cabinet and also the wiring complexity are reduced, because the emergency stop modules can be plugged on the load switches. Furthermore, the wiring complexity is also reduced, because the connection lines leading from the emergency stop module according to the state of the art to the normally closed contacts of the load switch or auxiliary switch as well as to the connections of the load switches are omitted, or implemented in a component assembly consisting of load switch and emergency stop module.

The embodiment according to the invention achieves that the "feedback data," which in conventional wiring reaches the emergency stop module via the feedback loop, is transmitted via the mechanical positive coupling of the "plug-on interface" from the load switches to the switching means integrated in the emergency stop modules.

The positively driven switching means for the detection of the switching status of the load switch can be designed as a mechanical normally closed contact or as an optical switching element.

In a preferred embodiment, the switching means for controlling the load switch are designed as a normally open contact, particularly as a series connection of two normally open contacts, wherein each normally open contact can be controlled by a safety relay by means of the logic circuit.

Alternatively, the switching means for the control of the load switch can also be designed as semiconductor switching elements, such as transistors.

The first emergency stop module is preferably designed as master module, and the second emergency stop module as slave module, wherein a communication interface is formed between the master module and the slave module. The master module is preferably connected to the slave module via the communication interface, such as, electrical conductors.

An emergency stop module according to the invention is characterized in that it is designed as a plug-on module which can be plugged on the load switch, and comprises at least one switching means that is positively opened with the load switch, such as, a normally closed contact or optical switching means, the switching status of which can be detected by means of the logic circuit, as well as an interface for connection to an additional plug-on emergency stop switch.

A preferred embodiment is characterized, compared to the state of the art, in that the first switching means module, i.e., the auxiliary switch of the first load switch, is designed as an emergency stop master module, wherein the logic circuit as well as at least the first enabling path is integrated in the emergency stop master module, and wherein the first positively driven switching means is connected to a first input of the logic circuit, and at least the first enabling path is connected via an output terminal to a connecting terminal of the load switch, and wherein the second switching module, i.e., the auxiliary switch of the second load switch, is designed as an emergency stop slave module comprising at least the second positively driven switching means as well as an output terminal which is connected to a connecting terminal of the second load switch.

This arrangement achieves that the emergency stop module arrangement now comprises only four components, namely the two load switches as well as the emergency stop modules which are coupled mechanically to the load switches, and preferably plugged on the load switches.

Depending on the embodiment of the emergency stop modules, the interface connection can comprise two or more connection lines. The interface connection serves for the transmission of a control signal for the control of the second load switch, for the detection of the switching status of the second positively driven switching means, and for the energy transmission with the emergency stop slave module.

An additional preferred embodiment is characterized in that the emergency stop master module has two input terminals for the detection of the switching status of the positively driven switching means of the emergency stop slave module, wherein the input terminals are connected via connection lines of the interface connection to output terminals of the emergency stop slave module.

An additional preferred embodiment is characterized in that the emergency stop master module has the enabling paths for the first and second load switch, wherein inputs of the enabling paths are connected via a module internal connection line to the supply voltage L, and wherein an output of the first enabling path is connected to the output terminal for the control of the first load switch, and wherein an output of the second enabling path is connected to an output terminal of the emergency stop master module, which terminal is connected via a connection line of the interface connection to an input terminal of the emergency stop slave module, which terminal is connected via a module internal connection line to an output terminal which is connected via a connection line to a connecting terminal of the second load switch.

Additional details, advantages and characteristics of the invention result not only from the claims, the characteristics to be obtained from them—separately and/or in combination—, but also from the following description of preferred embodiment examples that can be obtained from the drawings.

Figure 3:
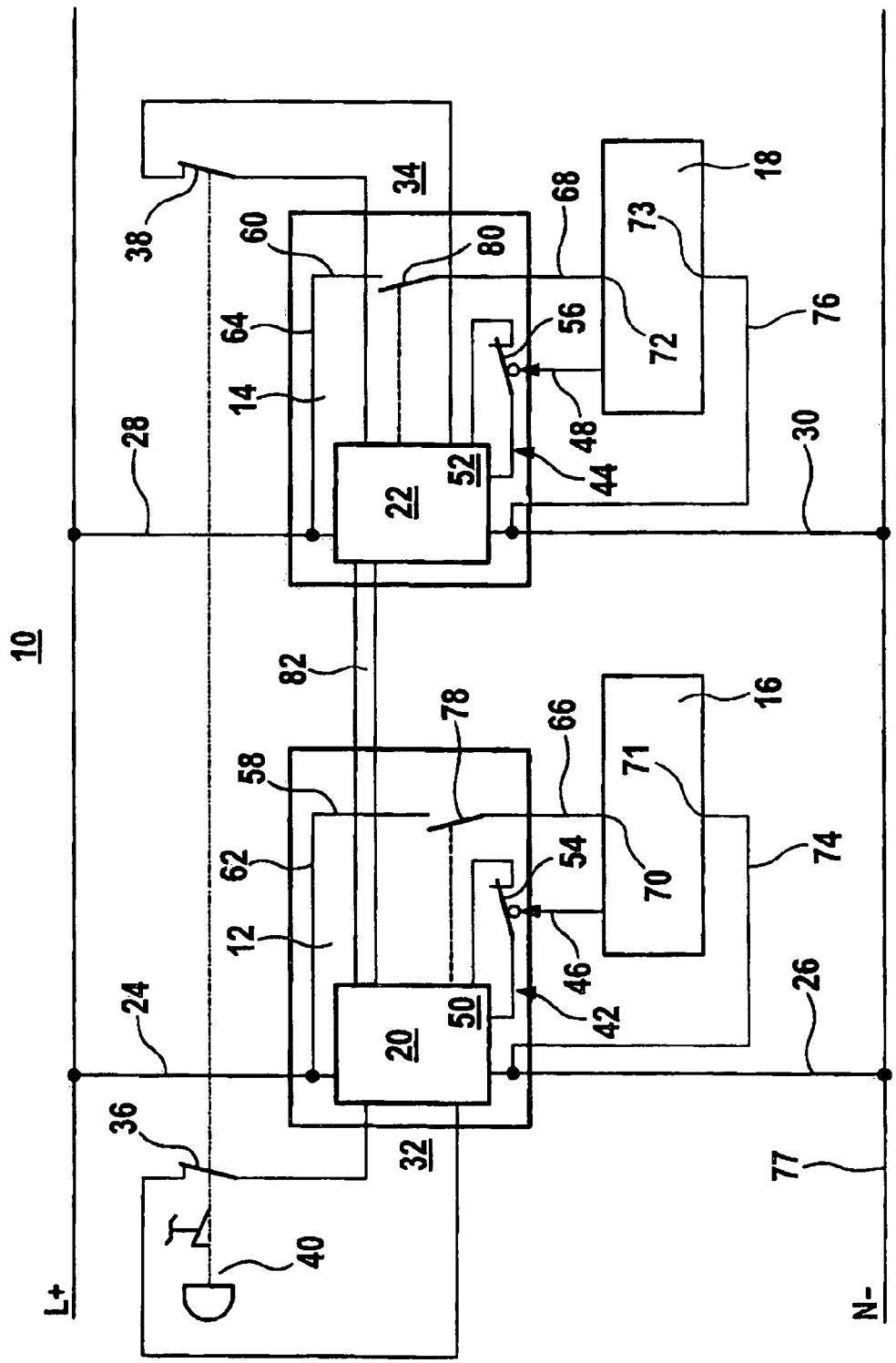
Figure 4:
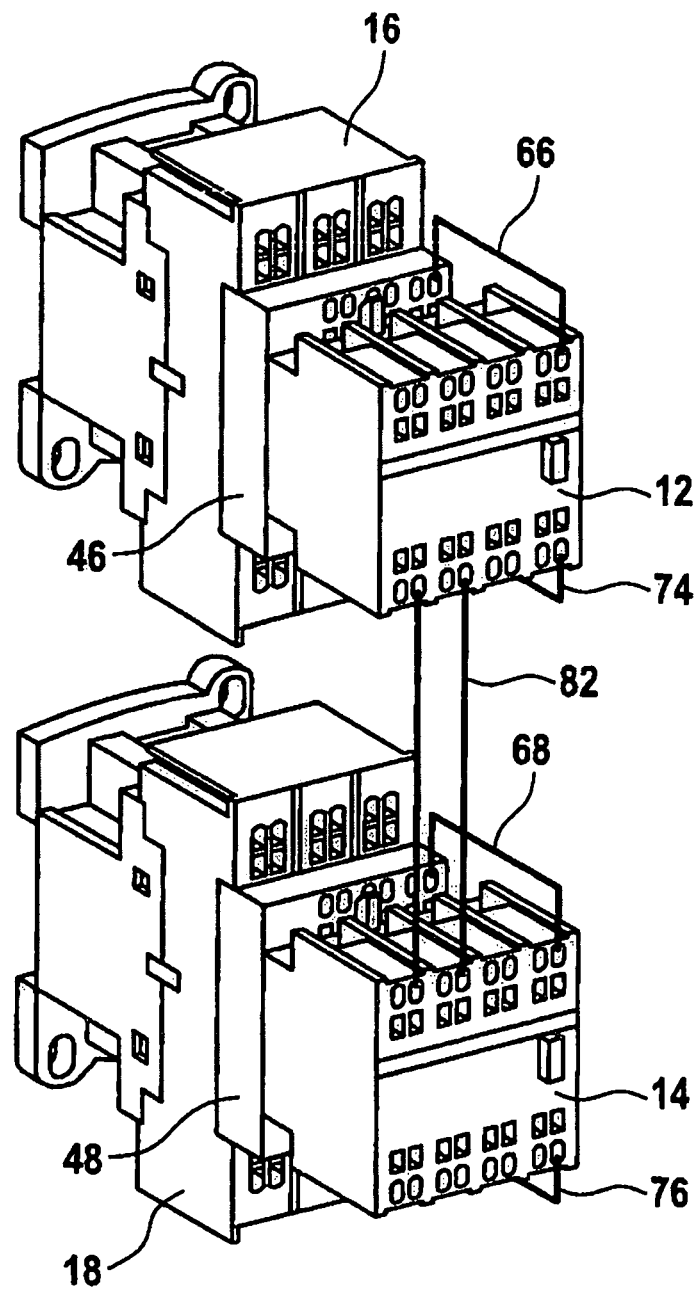
Figure 5:
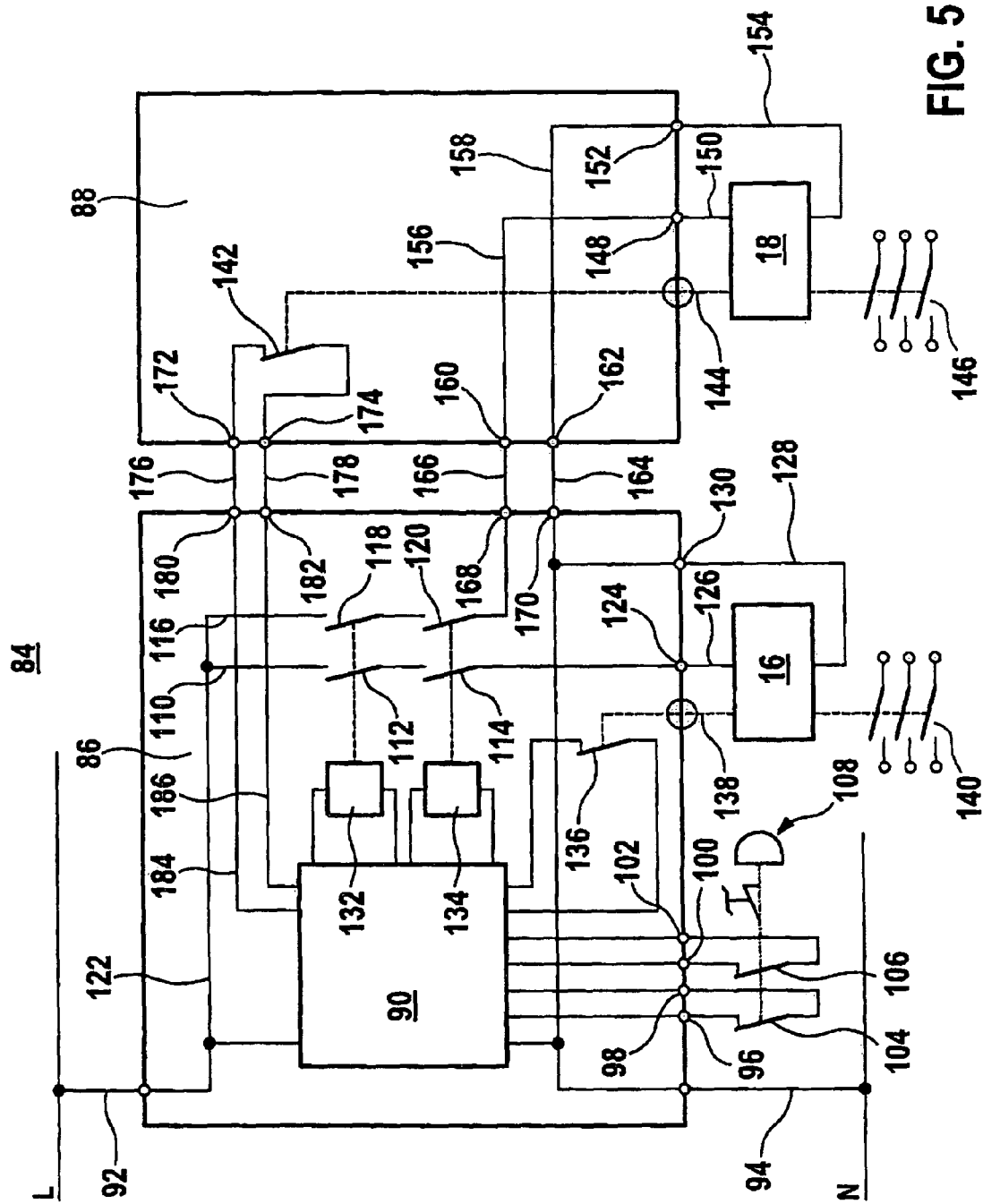
Figure 6:
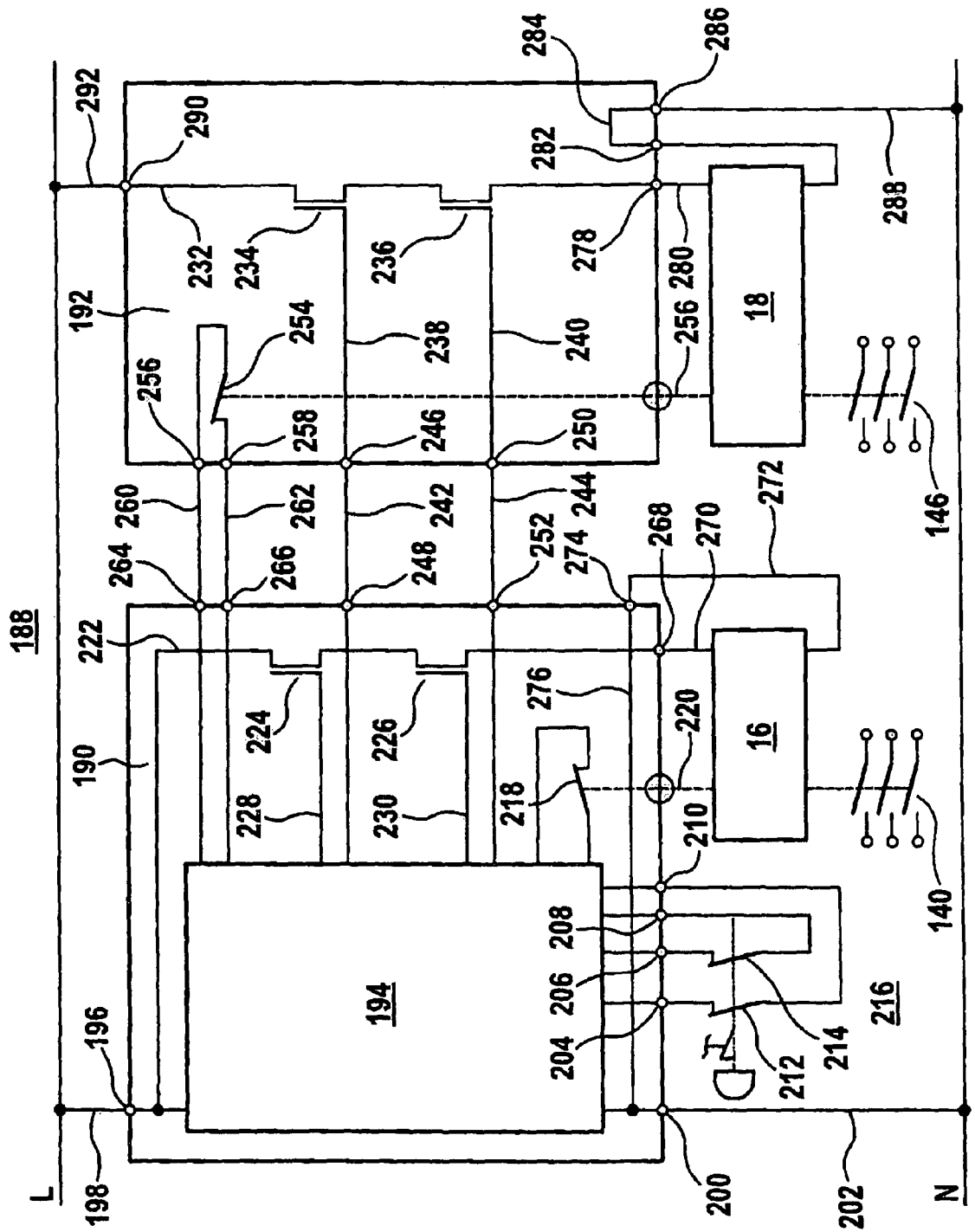

The figures show:

FIG. 1 an emergency stop safety circuit according to the state of the art,

FIG. 2 a perspective view of components of the emergency stop safety circuit according to FIG. 1 with conventional wiring, FIG. 3 a first embodiment of an emergency stop safety circuit according to the invention, FIG. 4 a perspective view of components of the safety circuit according to the invention having a reduced wiring complexity, FIG. 5 a second embodiment of an emergency stop safety circuit according to the invention, and FIG. 6 a third embodiment of an emergency stop safety circuit according to the invention.

FIG. 3 shows a schematic representation of an emergency stop safety circuit 10 according to the invention. Said safety circuit comprises a first emergency stop module 12, a second emergency stop module 14, as well as load switches 16, 18 that can be controlled by the emergency stop modules 12, 14. The emergency stop modules 12, 14 are designed as plug-on modules that can be plugged on the load switches 16, 18, so that said modules are coupled via a mechanical positive coupling to one of the load switches 16, 18, as shown in FIG. 4.

The emergency stop modules 12, 14 have the same design and comprise a logic circuit 20, 22 which is connected via a supply line 24, 28 to supply voltage L+, and via a supply line 26, 30 to a neutral conductor N−.

The logic circuit 20, 22 has an input 32, 34 for the detection in each case of a normally closed contact 36, 38 of an emergency stop switch 40. The emergency stop switch 40 has a two-channel design, wherein the normally closed contacts 36, 38 are connected to each other via a mechanical positive coupling.

The invention further provides that the emergency stop module 12, 14 in each case has at least one switching means, such as, the normally closed circuit 42, 44, which is coupled to the respective load switch 16, 18 via a mechanical positive coupling 46, 48, so that, when the load switch 16, 18 is connected, the switching means, such as, the normally closed circuit 42, 44, opens, and then, when the load switch 16, 18 has dropped down, the switching means, such as the normally closed circuit 42, 44, is closed.

A switching status of the normally closed circuit 42, 44 is detected via an input 50, 52 of the logic circuit 20, 22. The normally closed circuit 42, 44, as shown in an example in FIG. 3, can be designed as the mechanical normally closed contact 54, 56. Alternatively, the normally closed circuit 42, 44 can have an optical switching element, the switching status of which changes due to the mechanical positive coupling to the load switch 16, 18.

The emergency stop module 12, 14 has an enabling path 58, 60 which is connected, inside the housing, via a connection line 62, 64 to supply voltage L+, and via an external connection line 66, 68 to a first connection 70, 72 of the load switch 16, 18. A second connection 74, 76 of the load switch 16, 18 is connected via a connection line 74, 76 to a neutral conductor connection 77 of the emergency stop module 12.

In the represented embodiment example, the enabling path 58, 60 has a switching element, such as the normally open contact 78, 80, which can be controlled via the logic circuit 20, 22 by means of relays. Depending on the embodiment, the enabling path 58, 60 can also comprise several series-connected switching elements (not shown).

For data exchange, particularly data on switching statuses of the normally closed contacts 36, 38 of the emergency stop switch 40, on the switching statuses of the normally closed circuits 42, 44 as well as on the statuses of the enabling paths 58, 60, the logic circuits 20, 22 are coupled to each other via a communication connection 82.

In an embodiment, the first emergency stop module 12 is designed as master module which is connected via the communication connection 82 to the second emergency stop module 14, which is designed as an emergency stop slave module. Signals are exchanged between the master and slave module via the communication connection 82.

The enabling paths have switching elements 78, 80 which can be designed as relay contacts or semiconductor switching elements which are controlled via the respective logic circuits 20, 22.

The small space requirement in a switching cabinet as well as the reduced wiring complexity achieved by the safety circuit according to the invention can be clearly seen by comparing the embodiments according to FIG. 2 and FIG. 4.

The reduced wiring complexity results from the integration of the functionality of the known emergency stop module in the emergency stop plug-on modules 12, 14 which can be plugged on the load switches 16, 18, wherein, in each one of the emergency stop plug-on modules 12, 14, at least one normally closed circuit 42, 44 which is positively driven with the load switch 16, 18 is implemented for the detection of the switching status of the load switch 16, 18.

The wiring needed for the feedback loop in particular is omitted according to the embodiment of the invention, since the normally closed contacts 54, 56 are already integrated in the emergency stop module 12, 14.

FIG. 4 shows the load switches 16, 18 as well as the emergency stop modules 12, 14 plugged on them. They are connected to each other only via the communication connection 82, ensuring not only a reduced place requirement but also a reduced wiring complexity.

The connection lines 66, 68, 74, 76 could already be applied on the emergency stop plug-on module 12, 14 as delivered, so that the user needs to connect said connection lines only to connections 70, or 72, 73 of the load switch 16, 18, after the emergency stop plug-on modules 12, 14 have been plugged on.

FIG. 5 is a purely diagrammatic representation of a second embodiment of a safety circuit 84 comprising a first emergency stop plug-on module 86 which can be plugged on the load switch 16, as well as a second emergency stop plug-on module 88 which can be plugged on the load switch 18.

In the embodiment shown, the emergency stop plug-on module 86 comprises a logic circuit 90 which is connected via a connection line 92 to supply voltage L. Moreover, the logic circuit 90 is connected via a connection line 94 to neutral conductor N.

Connecting terminals 96, 98 as well as 100, 102 for the normally closed contacts 104, 106 of an emergency stop switch 108 are provided on the emergency stop plug-on module 86. The connecting terminals 96-102 are connected to the logic circuit 90.

For the control of the first load switch 16, a first enabling path 110 is provided, which comprises the normally open contacts 112, 114, as well as a second enabling path 116 which comprises the normally open contacts 118, 120. The enabling paths are connected on the input side via an internal connection line 122 to supply voltage L.

An output of the enabling path 110 is connected to a connecting terminal 124 which is connected via a connection line 126 to a connection of the load switch 16. A second connection of the load switch 16 is connected via a connection line 128 to a connection 130 of the emergency stop plug-on module 86 which is connected internally to the neutral conductor N.

The normally open contacts 112, 118 as well as 114, 120 of the enabling paths 110, 116 in each case are controllable with relays 132, 134 which are controllable by means of the logic circuit 90.

Moreover, in the emergency stop plug-on module 86, a normally closed contact 136 is provided, which is positively coupled via a mechanical interface 138 to contacts 140 of the load switch 116.

Via the mechanical interface 136, the switching position of the normally open contacts 140 of the load switch 160 is transferred by mechanically positive coupling to the normally closed contact 136. This ensures that the normally closed contact 136 reliably reproduces the switching position of the switch 16.

The emergency stop plug-on module 80 can be referred to as an emergency stop master, while the module 88, whose design is simpler compared to the emergency stop plug-on module 86, can be referred to as an emergency stop slave module. The latter comprises a normally closed contact 142 which is mechanically positively coupled via a mechanical interface 144 to normally open contacts 146 of the load switch 18.

In the emergency stop slave module 88, a connecting terminal 148 is provided, which is connected via a connection line 115 to a connection of the load switch 18, as well as a connecting terminal 152 which is connected via a connection line 154 and a second connection of the load switch. The connecting terminals 148, 150 are connected via internal connection lines 156, 158 to connecting terminals 160, 162. The latter are connected via connection lines 164, 166 to connecting terminals 168, 170 of the emergency stop master module 86. The connecting terminal 168 is connected to a connection of the second enabling path 116, and the connecting terminal 170 is connected to the neutral conductor 94.

The second embodiment of the safety circuit is characterized in that the entire logic control 90 as well as the auxiliary relay 132, 134 are integrated with the normally open contacts 105, 118; 114, 120 in the emergency stop plug-on module 86 referred to as an emergency stop master module. By comparison, only the mechanically positively coupled normally closed contact 142, as well as the connection lines 156 for the connection to the enabling path, and the connection line 158 for the connection to ground, are still integrated in the emergency stop slave module 88. The normally closed contact 142 is also led to the outside with the connections 172, 174, and connected via connection lines 176, 178 to connections 180, 182 of the emergency stop master module 86, which are connected via connection lines 184, 186 to the logic circuit 90, so that the switching status of the normally closed contact 142 can be detected.

FIG. 6 shows a third embodiment of a safety circuit 188 which also has an emergency stop master module 190 and an emergency stop slave module 192.

The emergency stop master module 190 comprises a logic circuit 194 which is connected to a connecting terminal 196 of the emergency stop master module 190, which terminal is connected externally via a supply line 198 to supply voltage L. Moreover, the logic circuit 194 is connected to a connecting terminal 200 which is connected via a connection line 202 to the neutral conductor N.

Furthermore, the emergency stop master module 190 comprises connecting terminals 204, 206, 208, 210 for normally closed contacts 212, 214 of an emergency stop switch 216.

A normally closed contact 218 is further integrated in the emergency stop master module 190 which is mechanically positively coupled via a mechanically interface 220 to normally open contacts 140 of the load switch 16. The connections of the normally closed contact 218 are connected to the logic circuit 194.

A first enabling path 222 of the emergency stop master module 190 comprises a series connection of electronic semiconductor elements 224, 226, each of which is controllable via control lines 228, 230 by means of the logic circuit 194.

Accordingly, in the emergency stop slave module 192, a second enabling path 232 is provided, which comprises a series connection of the semiconductor switching elements 234, 236 which are each connected by means of control lines 238, 240 to the logic circuit 194 of the emergency stop master module 190. The connection is implemented via connection lines 242, 244 which are connected to connecting terminals 246, 248 or 250, 252.

Finally, in the emergency stop slave module 192, a normally closed contact 254 is also integrated, which is mechanically positively coupled via a mechanical interface 256 to normally open contacts 146 of the load switch 18. Connections of the normally closed contact are connected to connecting terminals 256, 258 of the emergency stop slave module 192, terminals which are connected via connection lines 260, 262 to connecting terminals 264, 266 of the emergency stop master module 190. The connecting terminals 264, 266 are connected internally to the logic circuit 194 for the detection of the switching status of the normally closed contact 254.

An output of the enabling path 222 is connected to a connection 268 which is connected via a connection line 270 to a first connection of the load switch 16, while a second connection of the load switch 16 is connected via a connection line 272 to a connecting terminal 274 which is connected via an internal connection line 276 to the neutral conductor N.

An output of the enabling path 232 in the emergency stop master module 192 is connected to a connection 278 which is connected via a connection line 280 to a control input of the load switch 18, the second control input of which is connected to a connection 282 of the emergency stop master module 192. Via an internal connection 284, the connecting terminal 282 is connected to an additional connecting terminal 286 which is connected externally via a connection line 288 to the neutral conductor N. An input of the enabling path 232 is connected to a connecting terminal 290 which is connected externally via a connection line 292 to supply voltage L.

The implementation of the emergency stop module according to FIG. 5 is characterized in that, in this embodiment, the relays 132, 134 for controlling the load switches 16, 18 are accommodated in the master module. However, for space reasons it can also be useful to integrate relay 134 in the slave module. However, in this case more connection lines between master and slave module are needed.

Alternatively, the load switches 16, 18 can be switched via semiconductor switches 224, 226; 234, 236, in an embodiment that is shown in FIG. 6. In this case, the slave module 192 would also be connected to the supply voltage L and to the neutral conductor N. The number of the connections 260, 262; 242, 244 between master and slave module could also be provided on a permanent basis, because the two power switches 16, 18 as a rule are installed close to each other. In each case, the connection would have to be sufficiently long so that the two power switches 16, 18 can be mounted next to each other or on top of each other.

The invention claimed is:

1. An emergency stop module arrangement comprising:
at least a logic circuit for the detection of switching status of normally closed contacts of an emergency stop switch and for the control of a first load switch and a second load switch by means of switching elements of a first and second enabling path for the safe connection and disconnection of a load,
wherein the emergency stop module arrangement has a first emergency stop module, as well as a second emergency stop module, and wherein the first emergency stop module is coupled via an interface connection to the second emergency stop module,
wherein the first and second emergency stop modules are configured as plug-on modules which can be plugged on the load switches,
wherein each of the first and second emergency stop modules has at least one switching means which is mechanically positively driven with the coupled load switch,
wherein the first emergency stop module and the second emergency stop module each have a logic circuit and one of the enabling paths,
wherein the first emergency stop module and the second emergency stop module each have input terminals for the normally closed contact of the emergency stop switch, and
wherein the logic circuits are coupled to each other via a communication connection for changing switching status of the normally closed contacts, switching status of the positively driven switching means, and switching status of the switching elements of the enabling paths.

2. The emergency stop module arrangement according to claim 1, wherein the positively driven switching means is designed as a mechanical normally closed contact for the detection of the switching status of the load switch.

3. The emergency stop module arrangement according to claim 1, wherein the positively driven switching means is configured as an optical switching element for the detection of the switching status of the load switch.

4. The emergency stop module arrangement according to claim 1, wherein switching means of the enabling paths are configured as normally open contacts which are arranged in a series connection of two normally open contacts.

5. The emergency stop module arrangement according to claim 1, wherein the switching elements are configured for the control of the load switch as semiconductor switching element, which is controlled using the logic circuit.

* * * * *